United States Patent [19]

Krivacic

[11] Patent Number: 5,572,238
[45] Date of Patent: Nov. 5, 1996

[54] COMPUTER USER INTERFACE FOR NON-DOMINANT HAND ASSISTED CONTROL

[75] Inventor: Robert T. Krivacic, San Jose, Calif.

[73] Assignee: Xerox Corporation, Stamford, Conn.

[21] Appl. No.: 379,817

[22] Filed: Jan. 27, 1995

[51] Int. Cl.⁶ .................................................. G09G 5/08
[52] U.S. Cl. ........................ 345/157; 345/156; 345/115
[58] Field of Search .................................. 345/161, 163, 345/167, 156, 157, 115, 119

[56] References Cited

U.S. PATENT DOCUMENTS

| 4,831,736 | 5/1989 | Bryant, Sr. | 345/163 |
| 5,006,836 | 4/1991 | Cooper | 345/163 |
| 5,045,842 | 9/1991 | Galvin | 345/161 |
| 5,122,785 | 6/1992 | Cooper | 345/163 |
| 5,421,590 | 6/1995 | Robbins | 345/161 |

OTHER PUBLICATIONS

Bier, Eric A. and Buxton, William, "Tool Glass: Movable Transparent User Interface Widgets", Aug. 1, 1993.

Primary Examiner—Kee M. Tung
Assistant Examiner—Matthew Luu
Attorney, Agent, or Firm—Fay, Sharpe, Beall, Fagan, Minnich & McKee

[57] ABSTRACT

A computer terminal user interface control is provided for allowing input from an operators non-dominant hand. Force sensitive resistor pairs are provided at right angles to one another. Forces applied to these transducers move a tool set to various sub-portions of a video display device. The user's dominant hand is then free to select from various sub-areas of the tool window positioned by the non-dominant hand in a simple and efficient manner.

15 Claims, 4 Drawing Sheets

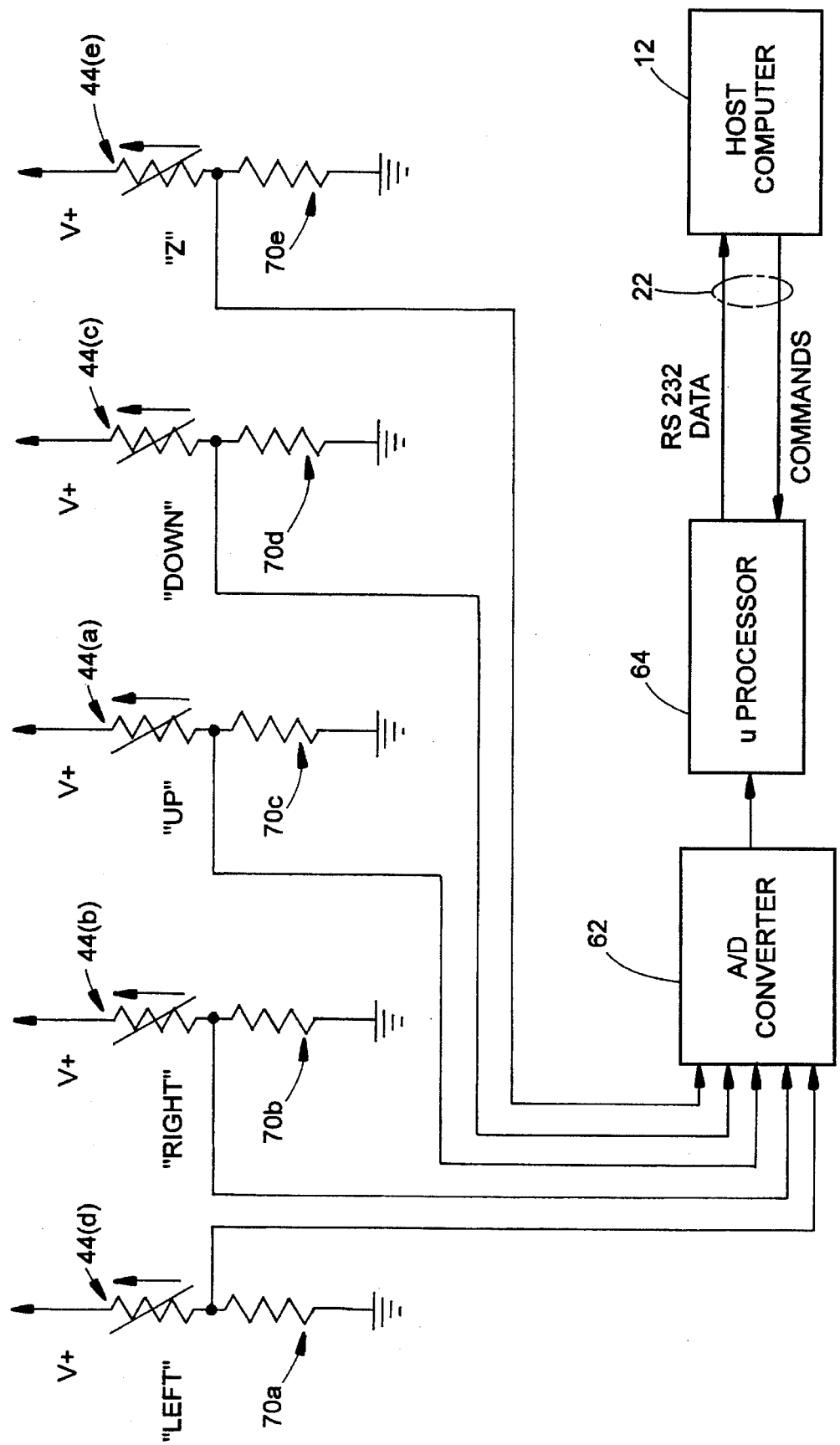

COMPUTER USER INTERFACE FOR NON-DOMINANT HAND ASSISTED CONTROL

BACKGROUND OF THE INVENTION

This application pertains to the art of human-machine interface and more particularly to a computer terminal user interface which allows for added control by an operator's non-dominant hand.

The invention is particularly applicable to computer aided design or drafting and will be described with particular reference thereto. However, it will be appreciated that the invention has broader application, such as in any computer user interface which employs a pointing device.

The dominant user interface employed today is a graphical display which works in conjunction with a hand-operated pointer. The most frequently used pointing device is a computer mouse. However, other such devices such as joy sticks, digitizing pads, track balls and the like are also widely used.

Such interfacing allows an operator to quickly position the cursor on a video display terminal ("VDT"), such as a cathode ray tube ("CRT"), liquid crystal display ("LCD"), or active or passive matrix displays.

Such graphical user interfaces ("GUIs") are regarded as highly efficient. Further, they provide an easy metaphor to allow computer operation by users who are not highly technical. An inefficiency with such devices arises when a particular action has to be taken on a particular portion of a video display. In these instances, a user must first select the particular "tool" which is desirable. After this, the user must apply the tool on the particular screen sub-area. This often requires several mouse or pointer operations. Thus, the task is rendered more complex and less efficient. Such inefficiencies are magnified for workstation usage at which operator's perform day-long activities, such as in computer aided design or drafting.

The subject invention contemplates a new and improved user interface which overcomes the above referred problems, and others, and provide a graphical user interface which is simple, efficient and easy to learn.

SUMMARY OF THE INVENTION

In accordance with the present invention, there is provide a secondary pointing device which is operated with a non-dominant hand of an operator and contemporaneously with operation of a conventional pointing device with a dominant hand.

In accordance with a more limited aspect of the present invention, there is provided a secondary pointing device which is particularly suited for operation with an operator's non-dominant hand.

In accordance with a yet more limited aspect of the present invention, the subject secondary pointing device is integrated to an existing portion of a conventional piece of computer equipment.

An advantage of the present invention is provided with a significant enhancement in overall speed and efficiency in implementing a graphical computer graphical user interface.

Yet another advantage of the present invention is a lessening of repetitive motions required to accomplish tasks while operating under a graphical user interface.

Yet another advantage of the present invention is the provision of a human/machine interface which minimizes operator fatigue, thereby resulting in even further enhanced efficiencies.

Further advantages will become apparent to one of ordinary skill in the art upon a reading and understanding of the subject specification.

BRIEF DESCRIPTION OF THE DRAWINGS

The invention may take physical form in certain parts, and arrangements of parts, preferred and alternate embodiments of which will be described in detail in the specification and illustrated in the accompanying drawings which form a part hereof, and wherein:

FIG. 4 provides a schematic of hardware to accomplish the subject non-dominant hand interface;

DETAILED DESCRIPTION OF THE PREFERRED AND ALTERNATE EMBODIMENT

Figure 1:
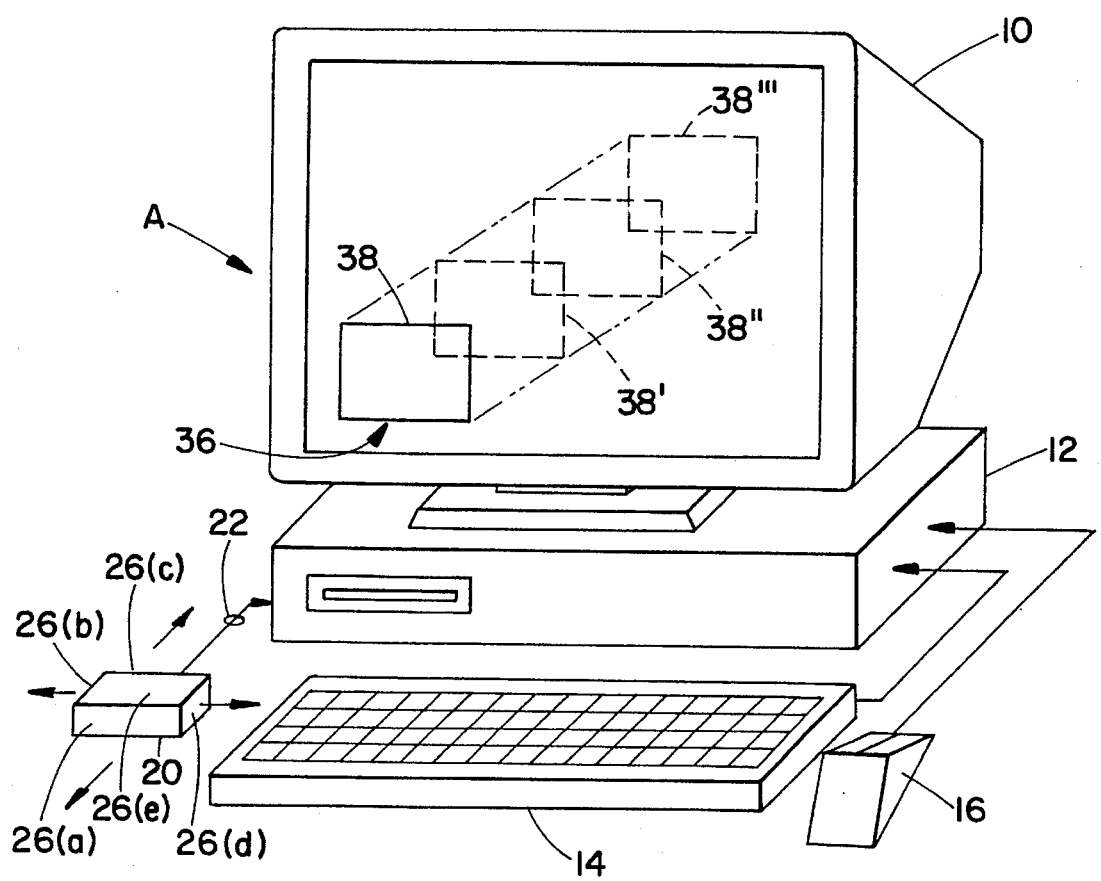
FIG. 1 illustrates a perspective view of a computer workstation employing the non-dominant hand assisted pointed device of the subject application.

Turning now to the drawings wherein the illustrations are for the purpose of illustrating the preferred and alternate embodiments of the invention only, and not for the purpose of limiting the same, FIG. 1 shows a workstation A. The workstation A includes a video display terminal ("VDT") 10 comprised of a CRT in this embodiment. The VDT is also suitably comprised of any graphical display device such as an active or passive matrix transistor display, liquid crystal display ("LCD"), plasma display, or the like. The VDT 10 provides visual output for a CPU module 12. It will be appreciate the CPU module 12 will provide the normal, functional components associated with the workstation such as memory, processor, non-volatile storage, input/output ("IO") control, and the like.

The workstation A also includes a keyboard 14, and a conventional pointing device 16, such as a mouse. Any other pointer device may be used instead of the illustrated mouse, such as a trackball, joystick, digitizing tablet, light pen, or the like. In the embodiment of FIG. 1, a module 20 is also provided in data communication with the CPU unit 12. In the preferred embodiment, this communication is accomplished by a serial (e.g. RS232) connection 22 which is suitably a serial cable, optical link, RF link, or the like. The module 20 includes four force sensitive areas 26(a)–26(d) disposed or aligned on four adjacently orthogonal sides of the module 20. These force sensitive areas allow for planar cursor control on the VDT 10 as will be detailed below. A fifth force sensitive area is suitably disposed on a top surface 26(e) to allow "Z-axis" cursor movement on the VDT 10.

Functionally, pressure of or force of generated by a human operator's non-dominant hand on the force sensitive areas 26 causes signaling to the CPU unit 12 via a data interconnection, such as serial interconnection 22. This is then translated to a graphical user interface.

Illustrated generally at 36 of FIG. 1 is a suitable default position for a relatively large cursor or movable window.

When no pressure is provided to the force sensitive areas 26 or 28 of the module 20, the system may optionally position the window 38 automatically at the default position 36. Another alternative is for the window to disappear when there is no force on the z-axis. Pressure on any of the force sensitive areas 26 causes a corresponding translation of the window 38 in the horizontal or vertical (or Z-axis) direction of VDT 10, respectively. Thus, the pressure on both force sensitive areas 26(*a*) and 26(*b*) would result in a repositioning of the window 38 to locations 38', 38" and 38'".

Pointer 16 is advantageously positioned next to a dominant hand of an operator. Although the illustration ms directed to a dextro-manual (right handed) user, it will be appreciated that relative positions of the module 20 and the mouse 16 may be readily reversed to accommodate a sinistro-manual (left handed) operator.

Figure 2:
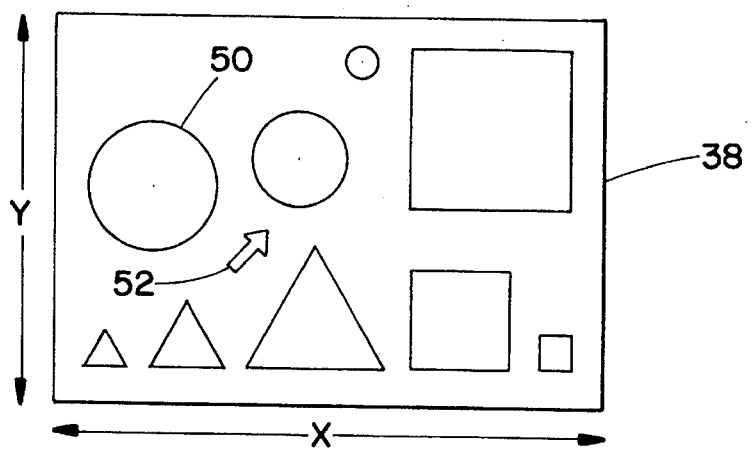
FIG. 2 illustrates an example of a sliding window display suitably used with the secondary pointing device and a cursor of a primary pointing device as described in the subject application.

Turning now to FIG. 2, an example of relative interaction between the output generated from the non-dominant hand module 20, the window 38 and the pointer 16 will be described.

Illustrated in FIG. 2 is a suitable implementation of the window 38. In the example of the FIGURE, the window 38 defines as subportions thereof a set of tools which allows a user to make use of an application. With the subject tools located on the window 38, a user may select one of a variety of "widgets" which are demonstrated with graphical primitives. With this combination, a user's eyes need never leave the VDT work area.

The window 38, which is operated or positioned by a user's weak or non-dominant hand, is responsible only for coarse interface directives. When a user has coarsely positioned, for example, a circle area 50 on a selected portion of an underlying picture, a cursor 52, associated with pointer 16, may be used to select the object for finer positioning. At this point, the user may use his or her dominant hand to finally position the primitive within the underlying display area. The window 38 is no longer necessary and is suitably caused to be removed from view (such as by releasing pressure from Z-axis area 26(*e*)). Concurrently, the window 38 may optionally be returned automatically to its default position 36 (FIG. 1).

Although the window 38 in FIG. 2 has been provided as an illustrative example, it will be appreciated that other widgets may suitably be implemented. For example, rather than drawing tools, textual tools, input/output control tools, and the like may also be provided. In each instance, the preferred embodiment provides relative motion in the "x" direction by depressing selected force sensitive areas and relative motion of the window "y", or "Z" directions by depressing others.

Figure 3A:
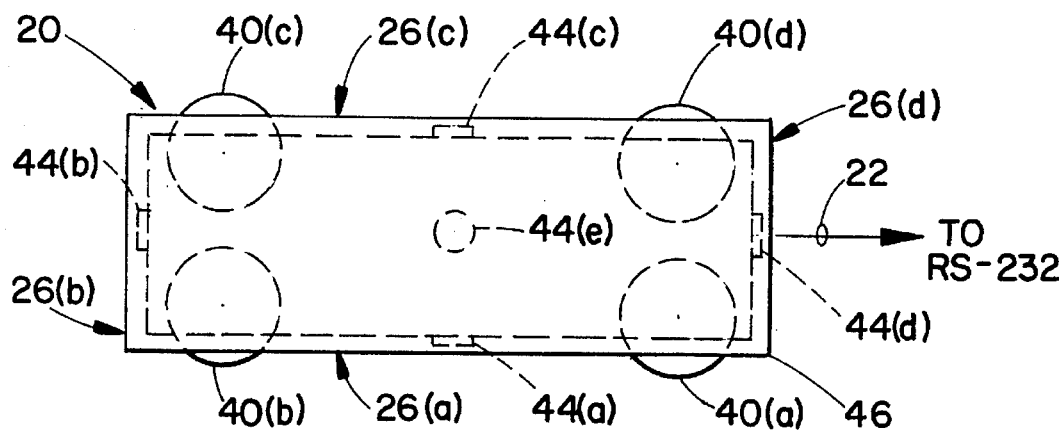
FIG. 3 shows side and top views of the non-dominant hand user interface unit of the preferred embodiment.
Figure 3B:
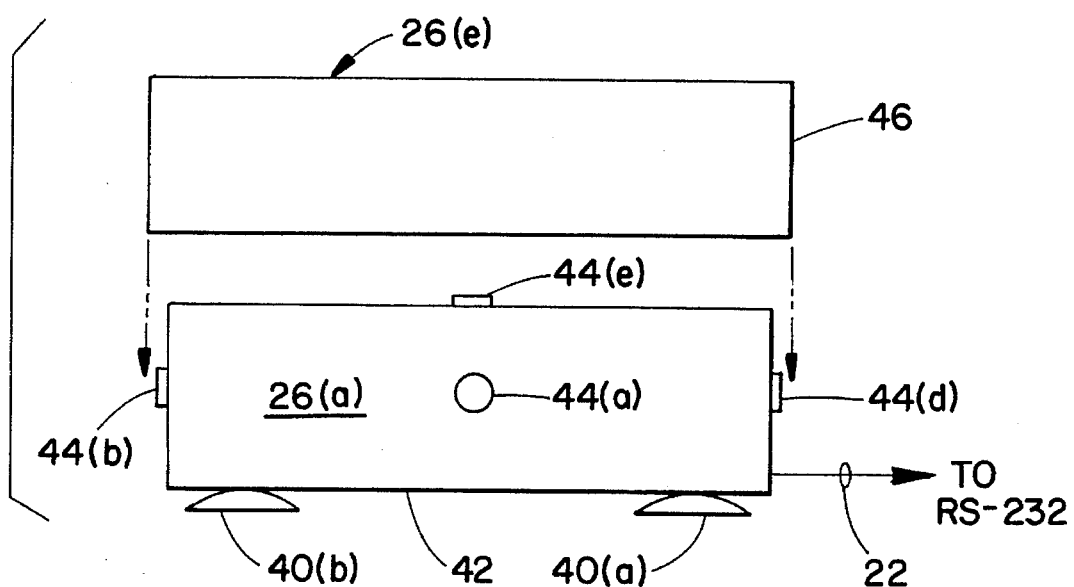

FIG. 3 illustrates side and top views of a module 20 of the preferred embodiment. The force sensitive areas 26(*a*)–26(*e*), noted in FIG. 1, are provided in greater detail in this figure. In the illustrated embodiment, a securing means 40 is comprised of four suction cups 40(*a*)–40(*d*). This securing means functions to secure a base of the module 20 to a desk top or other unit to allow operator pressure on the force sensitive areas 26. The securing means 40 are affixed to a base portion 42 of the module 20. Thus, the base portion 42 is maintained generally unmovable relative to an associated work station or a desk top. It will be appreciated that other means 40, such as a friction pad, direct fastener, or the like may be readily substituted for the illustrated suction cups.

Secured or attached to the base portion 42 are force sensitive resistors 44 comprised of FSR's 44(*a*)–44(*e*) in the preferred embodiment. The force sensitive resistors or FSR's 44(*a*)–44(*e*) correspond to force sensitive areas 26(*a*)–26(*e*), respectively. In the preferred embodiment, pairs of transducers share a common axis, e.g. 44(*a*)/44(*c*) and 44(*b*)/44(*d*) such that one transducer in the pair shall functionally counteract action of its complement when activated. It will be appreciated that a single, biased FSR may suitably serve both functions such that a compression or rarefraction thereof has the same affect as an oppositely disposed pair. Relative proximity of a moveable cover portion 46 which is disposed over top of the base unit 44 allows for triggering or activation of an FSR by a corresponding pressure on its mating force sensitive area. This signal is, in turn, communicated to the host computer workstation A (FIG. 1) by virtue of the interface 22.

Turning now to FIG. 4, a suitable electronic embodiment for full window control is described. Force sensitive resistors 44(*a*)–44(*e*) provide multi-directional control of the window 38. With this hardware platform, the operator may selectively position the window 38 to varying locations on a VDT. Associated with each of the force sensitive resistors 44(*a*)–44(*e*) is a corresponding biasing resistor 70$a$–70$e$. The biasing resistors 70 form a voltage offset from a specified base level. Pressure on the force sensitive resistors 44 provides an input to an analog-to-digital ("A/D") converter 62. A digitized signal resultant therefrom is communicated to a processor 64 and is output as serial data. This is, in turn, communicated to the host computer 12 as noted above.

Figure 5:
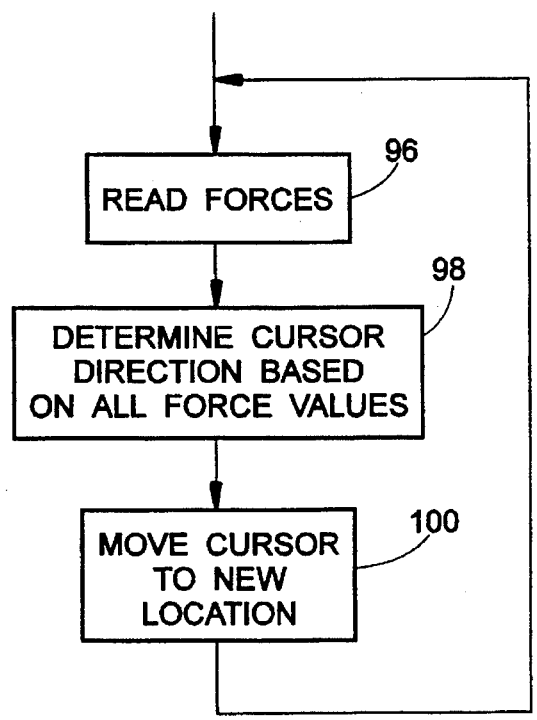
FIG. 5 is a flow chart for software implementation on a host computer to accommodate the hardware 64 of FIG. 4.

FIG. 5 provides an embodiment of activity at the host computer 12 in connection with the multi-axis hardware platform of FIG. 3. In this embodiment, force from all FSR's 44 are read at block 96. At block 98, a cursor position is determined on the basis of all the read force values. At block 100, the cursor is moved to a new location in accordance with these force values.

Figure 6:
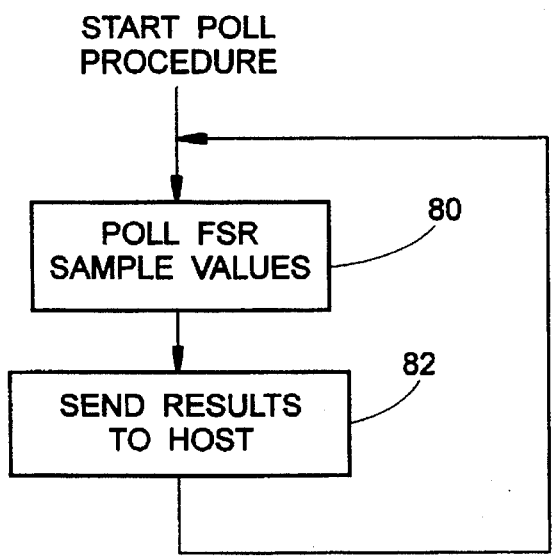
FIG. 6 is a flow chart for software control of the microprocessor 64 of FIG. 4.

Turning to FIG. 6, provided is a flow chart of a polling procedure by the microprocessor 64. In block 80, the processor 64 polls values associated with the force sensitive resistors as obtained from A/D converter 62. Next, at block 82, these values are communicated to the host computer 12 (FIGS. 1 and 3), via a link such as the RS232 interface of the preferred embodiment.

This invention has been described with reference to preferred embodiment. Obviously, modifications and alterations will occur to others upon a reading and understanding of this specification. It is intended that all such modifications and alterations be included in so far as they come within the scope of the appended claims or the equivalents thereto.

Having thus described the invention, it is now claimed:

1. A computer terminal user interface control comprising:

a first force-sensitive transducer pair defining a first force sensitive axis;

a second force-sensitive transducer pair defining a second force sensitive axis;

means for aligning the first and second force-sensitive transducer pairs such that the first force sensitive axis and the second force sensitive axis are disposed at an angle relative to one another; and a data processor including means for positioning the cursor on an associated video display terminal at a position relative to a default position in accordance with force applied to at least one transducer of the first and second transducer pairs;

wherein the cursor includes tools adapted to be activated by a second cursor generated by a second pointer controller.

2. The computer terminal user interface control of claim 1 wherein the aligning means further aligns the first and second force-sensitive transducers such that the first and second force-sensitive axes are disposed substantially orthogonally.

3. The computer terminal user interface control of claim 2 wherein:

the data processor is a general purpose digital computer; and the interface control further includes, means for receiving an analog output from each of the transducers, means for digitizing the analog output to form a digital transducer signal, means for communicating the digital transducer signal to the data processor.

4. The computer terminal user interface control of claim 3 wherein the aligning means is comprised of a module positionable relative to the associated video display terminal and the data processor.

5. The computer terminal user interface control of claim 4 wherein the aligning means is comprised of:

a base portion onto which is secured the force sensitive transducers;

means for selectively securing the base portion to an associated workstation surface; and a cover movably disposed relative to the base portion such that operator pressure on the cover induces selective pressure on at least one of the transducers.

6. The computer terminal user interface control of claim 4 further comprising means for selectively removing the cursor from the video display in accordance with an analog output from one of the transducers.

7. A two-handed computer terminal user interface control comprising:

a module adapted to be positioned next to a non-dominant hand of an associated operator, the module including, a first force-sensitive transducer pair defining a first force sensitive axis, a second force-sensitive transducer pair defining a second force sensitive axis, a third force-sensitive transducer having a third force sensitive axis, the first and second force-sensitive transducer pairs and the third force-sensitive transducer comprising force-sensitive transducers attached to the module such that the first force sensitive axis, the second force sensitive axis, and the third force sensitive axis are disposed at an angle relative to one another, each of the force-sensitive transducers generating an analog signal in accordance with force applied thereto, and an analog-to-digital conversion unit receiving analog signals from the force-sensitive transducers and generating a digital signal corresponding thereto;

a data processor including, means for receiving the digital signal from the analog-to-digital conversion unit, and means for positioning a video window including objects on an associated video display terminal at a selected position in accordance with force applied to at least one of the force-sensitive transducers;

a cursor associated with a pointer positioned next to a dominant hand of the associated operator for facilitating operator selection of one of the objects of the video window in accordance with a position of the pointer within the video window.

8. The two-handed computer terminal user interface control of claim 7 wherein the force-sensitive transducers are attached to the module such that the first and second force-sensitive axes are disposed substantially orthogonally to one another.

9. The two-handed computer terminal user interface of claim 8 further comprising means for selectively removing the window from the video display in accordance with an analog output from one of the force sensitive transducers.

10. A method of two-handed computer user interface control comprising the steps of:

receiving a tactile force from a non-dominant hand of an associated computer operator into a first force-sensitive transducer having a bidirectional first force sensitive axis;

receiving a tactile force from the non-dominant hand of the associated computer operator into a second force-sensitive transducer having a bidirectional second force sensitive axis disposed generally orthogonally to the first force sensitive axis;

generating an analog signaling in accordance with force applied to each of the first and second force-sensitive transducers;

generating, via an analog-to-digital conversion unit, digital signaling corresponding to the analog signaling;

receiving the digital signaling from the analog-to-digital conversion unit;

positioning a video window of an associated video display relative to a default position in accordance with the digital signalling;

communicating digital pointer data received from a pointer positioned next to a dominant hand of the associated operator; and receiving operator selection of a subportion of the video window in accordance with a position of the pointer within the video window.

11. The method of claim 10 further comprising the step of selectively removing the window from the video display in accordance with an analog output from one of the force sensitive transducers.

12. A pointing device comprising:

a first force-sensitive transducer means defining a first force sensitive axis for generating a first signal corresponding to any sensed axial force therealong;

a second force-sensitive transducer means defining a second force sensitive axis for generating a second signal corresponding to any sensed axial force therealong;

a base portion adapted to be rigidly secured to an associated desktop, the base portion rigidly securing each the first and second force-sensitive transducer means thereto such that the first and second force sensitive axis are angled relative to one another;

a handle portion movably disposed relative to the base portion such that induced movement of the handle portion induces corresponding force to at least one of the force-sensitive transducer means;

means for generating a digital cursor control signal in accordance with at least one of the first and second signals, whereby the digital control signal corresponds to force induced on any of the force-sensitive transducer means by application of force to the handle portion; and means for communicating the digital cursor control signal to an associated graphical user terminal.

13. The pointing device of claim 12 further comprising:

a third force-sensitive transducer means secured to the base portion and defining a third force sensitive axis generally orthogonal to at least one of the first and second force sensitive axes, wherein application of force along the third force sensitive axis generates a cursor enable signal representative as to whether the cursor is to be viewable on the associated graphical user terminal; and the means for communicating including means for communicating the cursor enable signal to the associated graphical user terminal.

14. The pointing device of claim 12 wherein the first force-sensitive transducer means comprises a pair of oppositely disposed transducers.

15. The pointing device of claim 14 wherein the second force-sensitive transducer means comprises a pair of oppositely disposed transducers.

* * * * *